United States Patent [19]

Vangsgard

[11] Patent Number: 5,009,270
[45] Date of Patent: Apr. 23, 1991

[54] EARTHWORKING MACHINE WITH SINGLE HANDLE FOR ADJUSTING AND LOCKING BLADE DEPTH

[75] Inventor: Kip S. Vangsgard, White Bear Lake, Minn.

[73] Assignee: Turfco Manufacturing, Incorporated, Minneapolis, Minn.

[21] Appl. No.: 480,587

[22] Filed: Feb. 15, 1990

[51] Int. Cl.$^5$ .................. A01B 45/04; A01B 63/26
[52] U.S. Cl. ........................ 172/42; 172/76; 172/19; 172/260
[58] Field of Search ............ 172/13, 17, 19, 20, 172/42, 43, 76, 259, 260, 348, 481, 668, 675; 56/17.1, DIG. 18

[56] References Cited

U.S. PATENT DOCUMENTS

| | | | |
|---|---|---|---|
| 471,231 | 3/1892 | Bentley | 172/19 |
| 743,277 | 11/1903 | Harlan | 172/20 |
| 776,844 | 12/1904 | Hudlemeyer et al. | 172/20 |
| 831,346 | 9/1906 | Hoover | 172/166 |
| 2,051,977 | 8/1936 | Winston et al. | 172/20 |
| 2,682,824 | 7/1954 | Bowser et al. | 172/19 |
| 2,702,502 | 2/1955 | Rogneby | 172/19 |
| 2,905,253 | 9/1959 | Ditter | 172/19 |
| 3,201,944 | 8/1965 | Christensen | 405/184 |
| 3,498,386 | 3/1970 | Daymon | 172/19 |
| 3,695,713 | 10/1972 | Rothi et al. | 299/10 |
| 3,777,460 | 12/1973 | Mokros | 172/42 X |
| 4,678,042 | 7/1987 | Barton et al. | 172/42 X |

Primary Examiner—Randolph A. Reese
Assistant Examiner—Jeffrey L. Thompson
Attorney, Agent, or Firm—Peterson, Wicks, Nemer & Kamrath

[57] ABSTRACT

Various earthworking machines make use of an oscillatory blade, such as the herein referred to sod cutter. Instead of employing two handles, one of which raises and lowers the blade and the other of which handles, when tightened, maintains the blade at a selected depth, only a single handle is employed. When the handle is manually moved forwardly, the blade is lowered and when moved rearwardly the blade is raised, but when the single handle is moved to the left the blade is locked at the depth that has been determined by the forward movement of the handle, this handle movement to the left camming a shiftable gear rack into engagement with a fixed gear rack to maintain the adjusted blade depth. Handle movement to the right allows a coil spring to disengage the racks. A stop, when appropriately set, enables the selected depth to be re-established after each raising of the blade whenever no change in blade depth is needed.

14 Claims, 6 Drawing Sheets

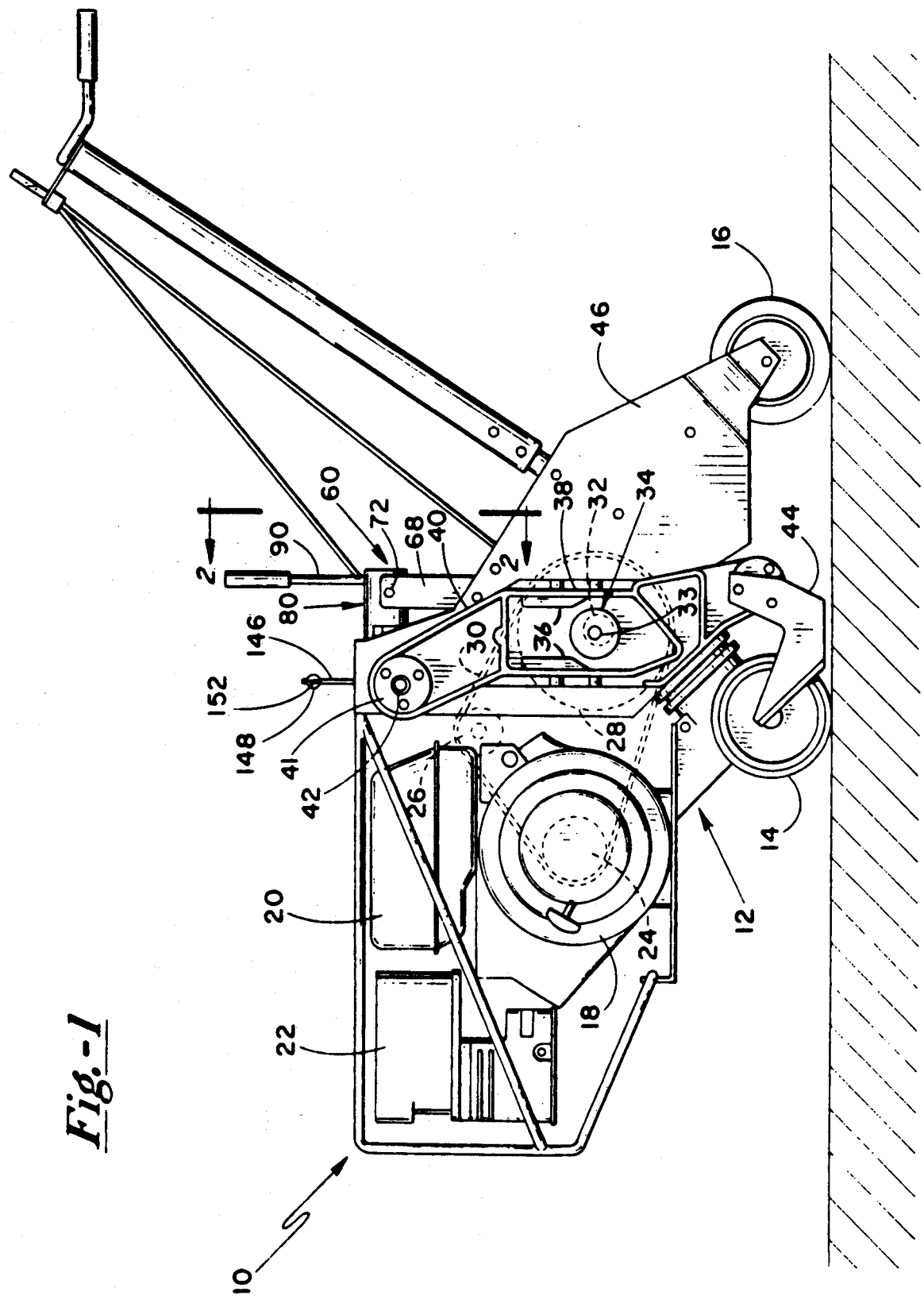

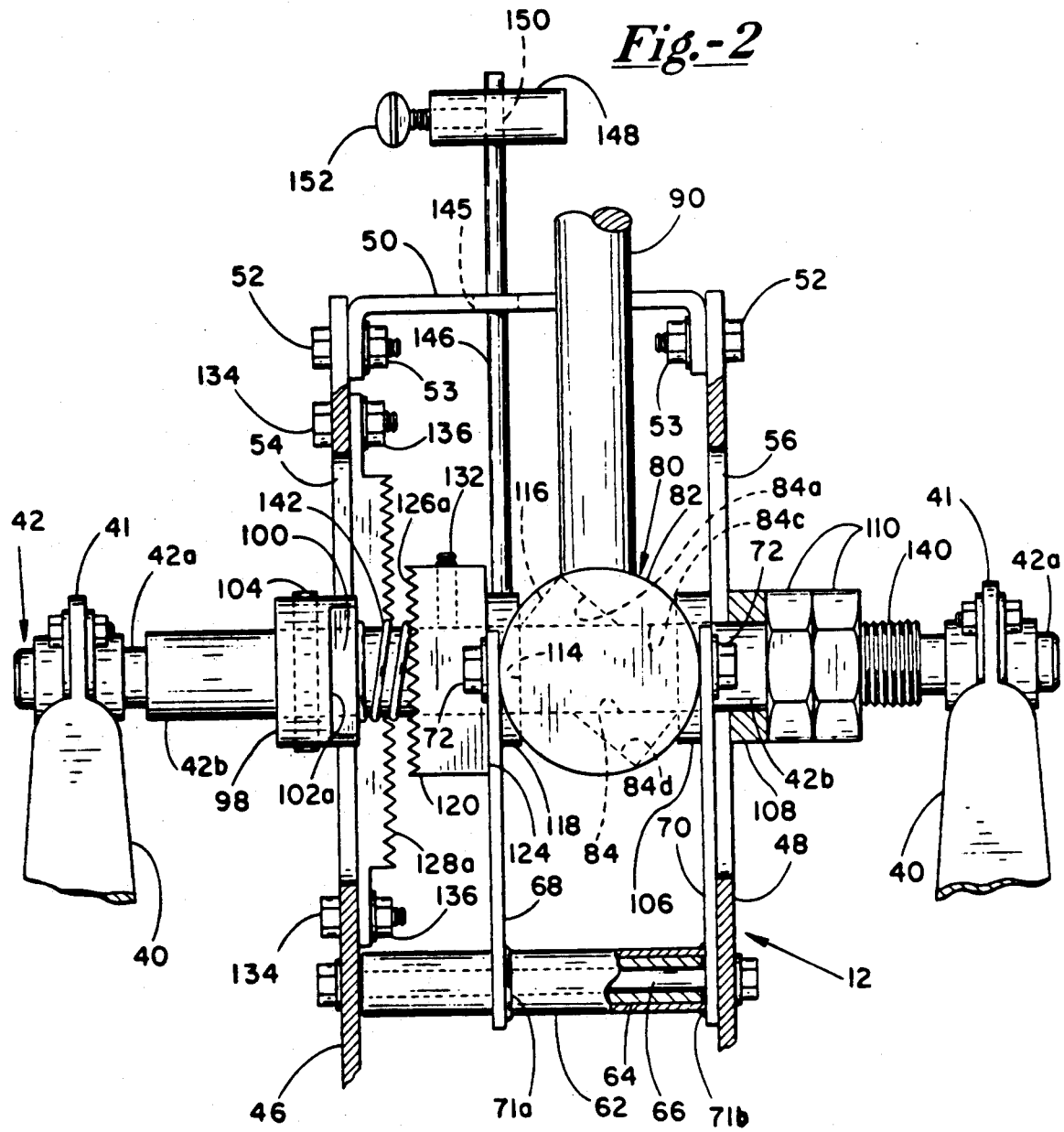

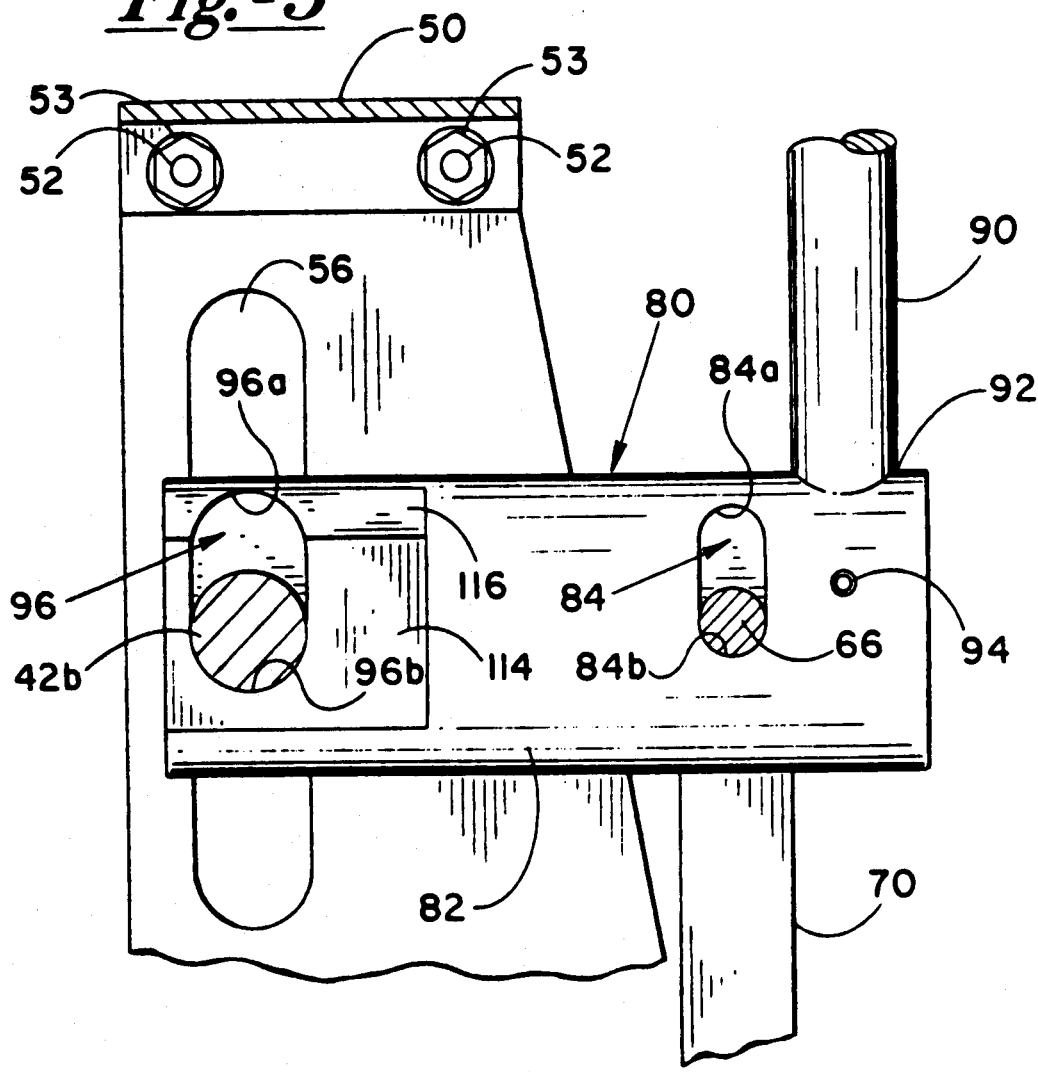

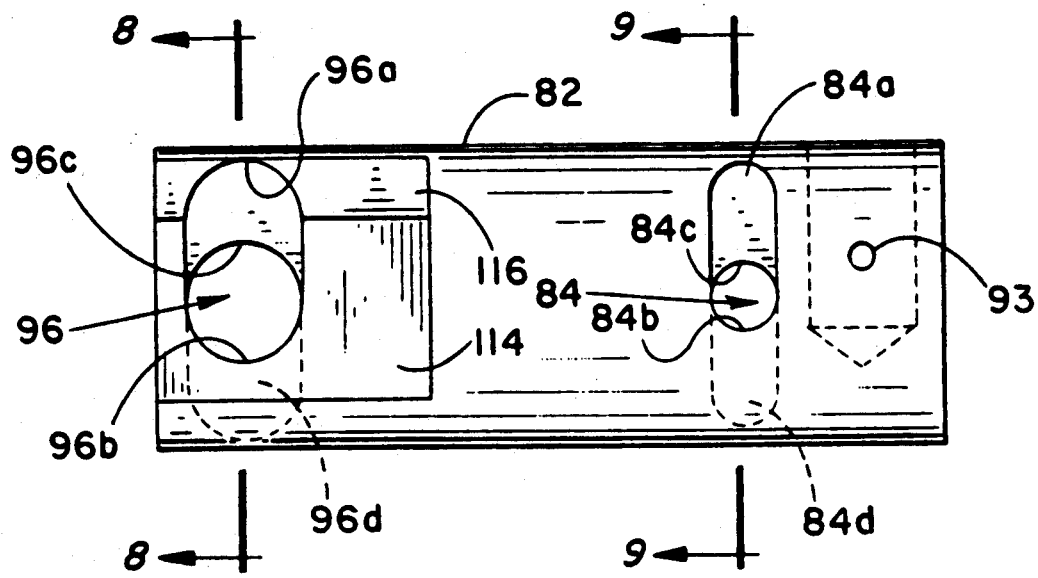
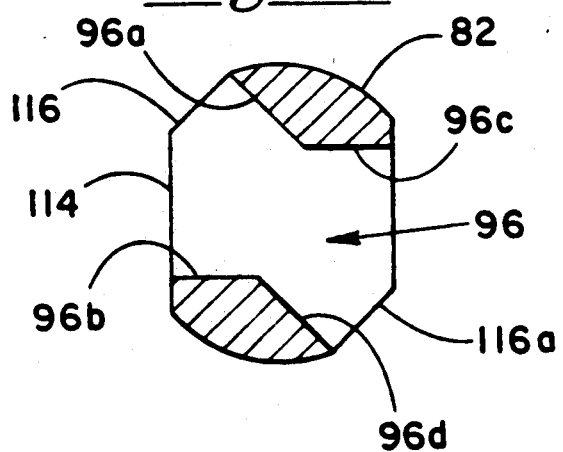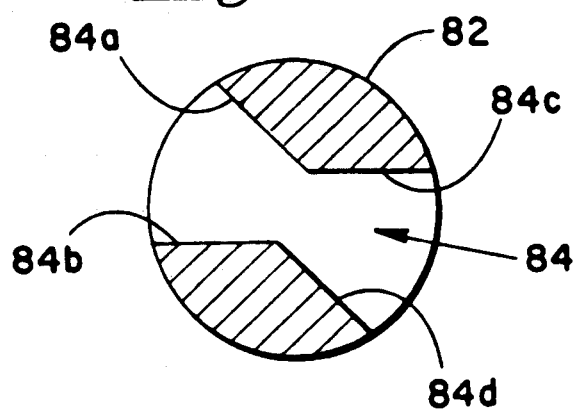

EARTHWORKING MACHINE WITH SINGLE HANDLE FOR ADJUSTING AND LOCKING BLADE DEPTH

BACKGROUND OF THE INVENTION

1. Field of the Invention

This invention relates generally to earthworking machines, such as sod cutters, edging machines and pipe laying machines, and pertains more particularly to such a machine in which the depth of the oscillatory blade is first selected and then locked at the selected depth, only a single handle being employed for achieving both the depth adjustment and the locking of the blade at the adjusted depth.

2. Description of the Prior Art

Sod cutters utilizing an oscillatory blade, oscillatory edging machines and oscillatory pipe laying machines have been rather widely employed. The state of the prior art, however, with respect to oscillatory blades is believed to be fairly represented by Francis J. Ditter U.S. Pat. No. 2,905,253, granted on Sep. 22, 1959 for "SOD CUTTING MACHINE." The patented machine utilizes two handles, one for vertically adjusting the depth of the oscillatory blade and a second handle, when tightened, maintaining the blade at its adjusted depth. Having to manipulate two handles, one for obtaining the blade depth and the other for maintaining the blade depth, has proved to be inconvenient and actually confusing, especially where the operator is not fully acquainted with the particular machine, such as a machine of the type disclosed in said Ditter patent.

SUMMARY OF THE INVENTION

An important object of my invention is to provide a mechanism involving only a single handle rather than two handles for first determining the desired depth at which an oscillatory blade is to be operated and to then lock the oscillatory blade at the adjusted depth.

Another object is to provide a positive mechanical locking system in contradistinction to the friction locking system now in use and which has been employed for a number of years, as evidenced by the aforesaid Ditter patent.

Yet another object of my invention is to achieve the foregoing objects and at the same time reduce somewhat the cost of manufacturing the equipment with my mechanism incorporated therein.

Still further, the invention has for an additional object both the initial selection of the desired cutting depth and the easy return to the selected depth. In this regard, it will be recognized that after completing a traverse across a field the oscillatory motion of the blade is normally continued during the turning of the equipment for a pass across the field in an opposite direction. Stated somewhat differently, the operator need not readjust the blade for the appropriate cutting depth once it has been initially established.

Briefly, my invention envisages a singe handle on an earthworking machine utilizing an oscillatory cutting action. The handle is mounted for movement in a fore and aft direction for determining the cutting depth and then moved in a transverse direction to lock the oscillatory blade at the depth that has been selected by the fore and aft movement of the handle. The fore and aft movement involves a simple lever movement that raises and lowers the pivot shaft at the upper ends of the cutting arms, and the locking action is derived by a movable gear rack that is enmeshed with a fixedly mounted gear rack, the engagement being effected when the singe handle is moved in one traverse direction and disengaged when the handle is moved in an opposite transverse direction. Hence, by moving the single handle in four directions, the operator is enabled to obtain the appropriate cutting depth and to thereafter maintain the selected depth. Provision is made for re-establishing the selected depth after each raising of the blade when a change in blade depth is not needed.

BRIEF DESCRIPTION OF THE DRAWINGS

FIG. 1 is a side elevational view of a sod cutter utilizing a single handle mechanism for adjusting the depth of the oscillatory blade and thereafter holding the blade at the adjusted depth;

FIG. 7 is a detail view of the cylindrical barrel forming an important portion of the cam unit;

FIG. 8. is a sectional detail taken in the direction of line 8—8 of FIG. 7; and

FIG. 9 is a sectional view taken in the direction of line 9—9 of FIG. 7.

DESCRIPTION OF THE PREFERRED EMBODIMENT

Figure 4:
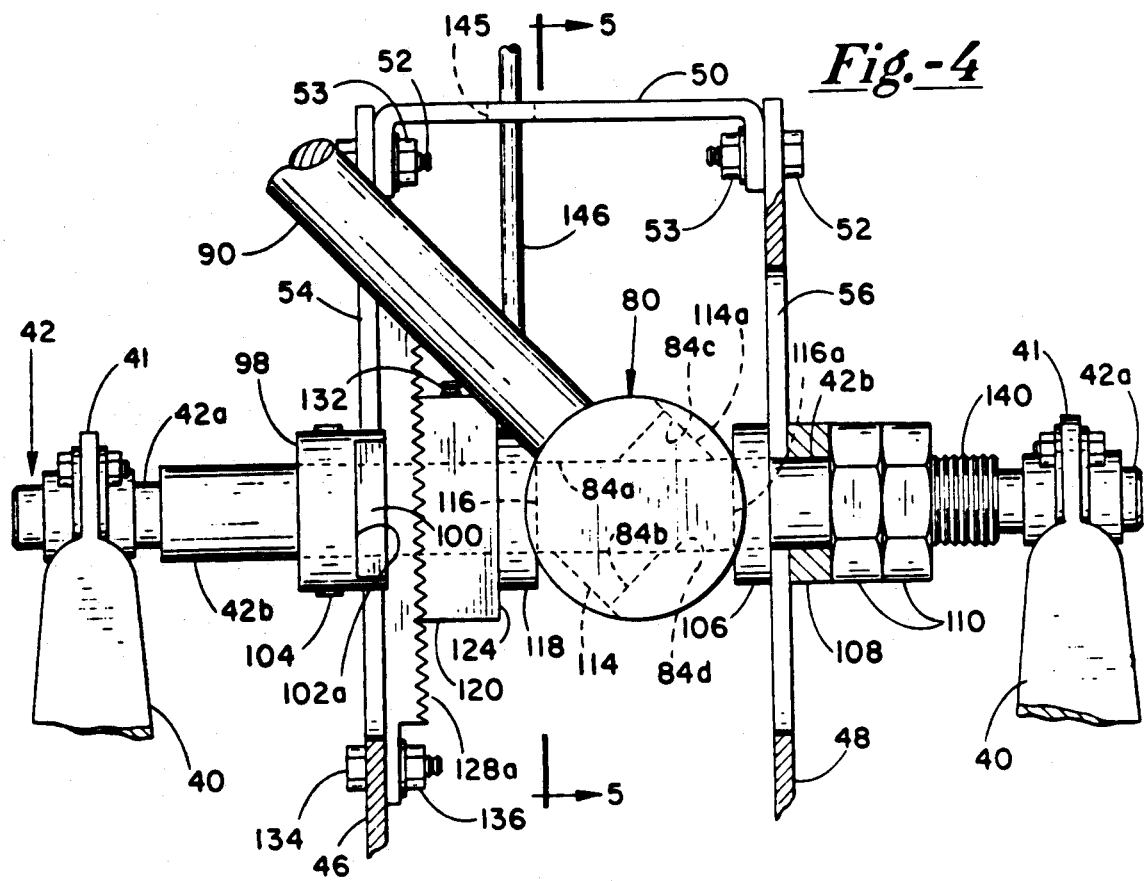
FIG. 4 is a view generally similar to FIG. 2, although omitting certain parts included in FIG. 2, the view illustrating the mechanism in a locked condition after the desired blade depth has been obtained.
Figure 5:
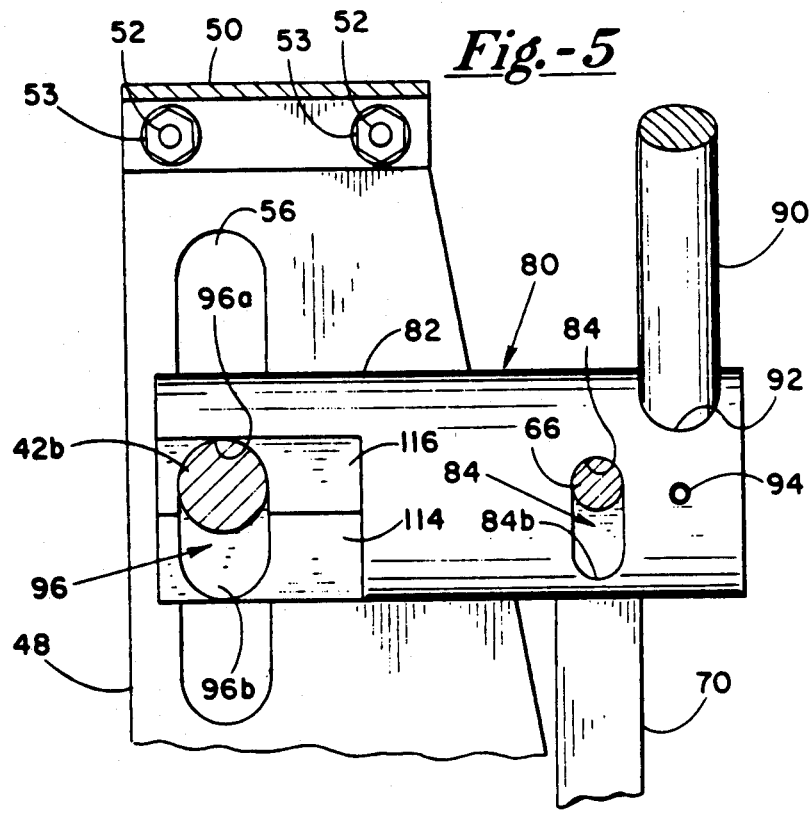
FIG. 5 is a view similar to FIG. 3, but taken in the direction of line 5—5 of FIG. 4.

As already indicated, my invention will be suitable for use with various types of earthworking machines involving an oscillatory blade movement. Sod cutters, edging machines and pipe laying machines have been specifically mentioned. However, the earlier-mentioned Ditter U.S. Pat. No. 2,905,253 illustrates a typical earthworking machine in the form of a sod cutter, and the disclosure of this patent is hereby incorporated herein by reference in order to avoid a detailed description of conventional sod cutter components. It will be helpful, though, to refer to some of the salient parts of a sod cutter, even though such parts are more clearly illustrated and understandable by reference to said Ditter patent, so a sod cutter has been denoted generally by the reference numeral 10 in FIG. 1.

With the above simplified approach in mind, it will be stated that the sod cutter 10 comprises a frame indicated generally by the reference numeral 12 and having traction wheels 14 (or a drum as disclosed in said Ditter patent) and a rear ground wheel 16.

Mounted on the frame 12 is an internal combustion engine 18 providing the propelling and oscillatory power for the sod cutter 10. As can be seen in FIG. 1, there is a fuel tank 20 surmounting the engine 18 and an air cleaner 22 through which air is drawn into the engine 18.

The internal combustion engine 18 has a drive pulley 24 mounted thereon. The drive pulley 24 is concealed so is shown only in phantom outline. Likewise, an idler pulley 26 is employed, as well as a driven pulley 28, there being a belt 30 entrained about the pulleys 24, 26, and 28. The pulleys 26 and 28 are depicted in phantom outline inasmuch as they are also hidden from view.

The driven pulley 28 is mounted on a rotatable shaft 32 having an eccentric or axially offset stub portion 33 on which is mounted a ball bearing assembly 34. Because the shaft 32 is concealed in FIG. 1, the end thereof appears as a phantomly outline circle. The bearing assembly 34 rotates between two drive cams or strips 36 fixedly mounted in a cam box 38, there being one such cam box 38 on each of a pair of flanged oscillatory side arms 40, one such arm 40 appearing in FIG. 1.

Figure 6:
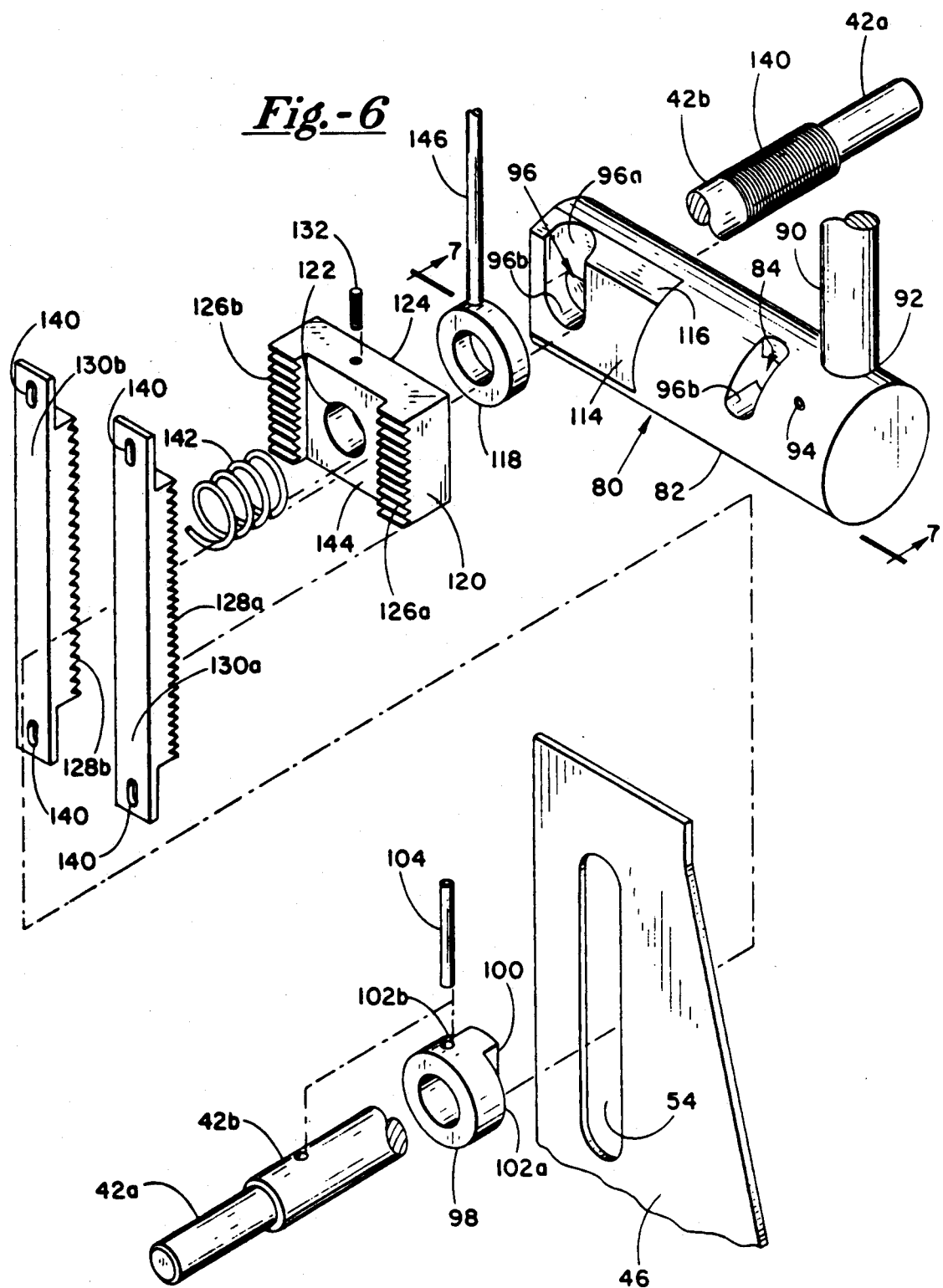
FIG. 6 is an exploded perspective view depicting the basic parts included in my mechanism for achieving the locking condition after the blade depth has been determined.
Figure 2:
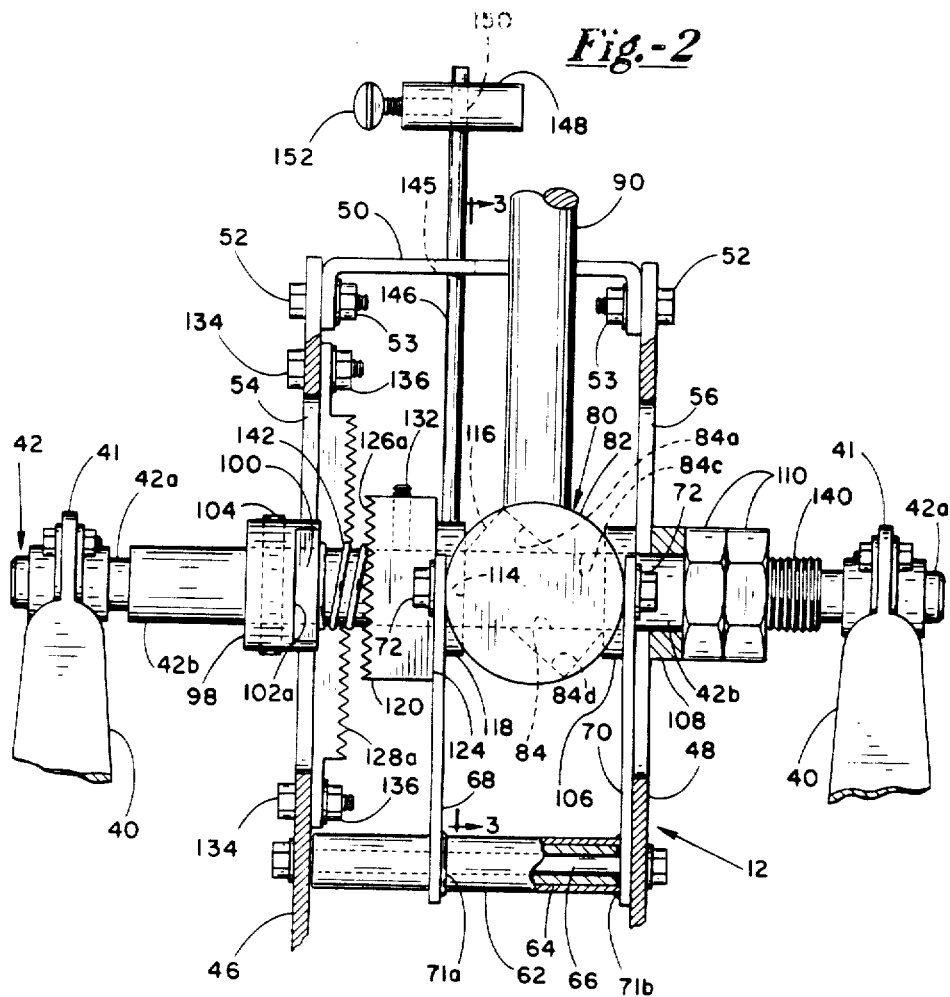
FIG. 2 is an elevational view looking forward, the view being taken generally in the direction of line 2—2 of FIG. 1, which illustrates my mechanism in an unlocked condition.
Figure 3:
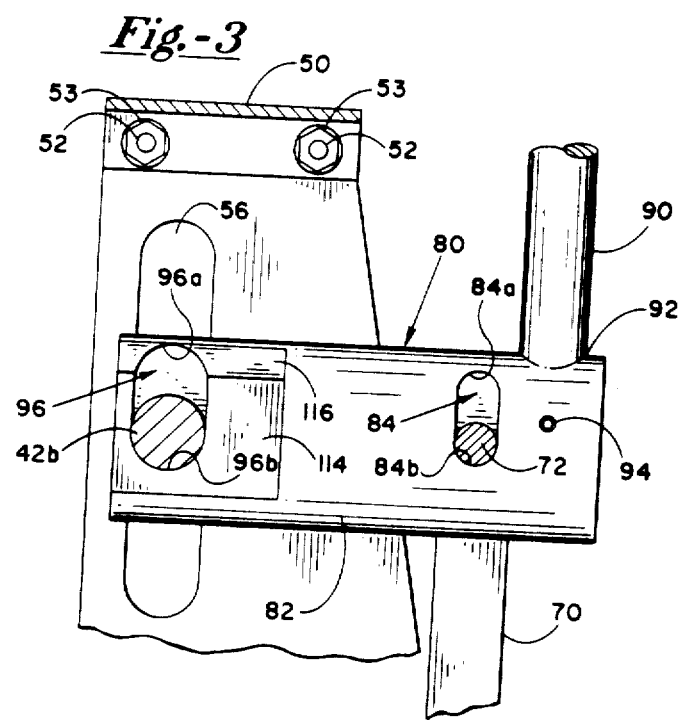
FIG. 3 is an enlarged detail view taken in the direction of line 3—3 of FIG. 2 for the purpose of illustrating a portion of the cam unit contained in my mechanism.
Figure 4:
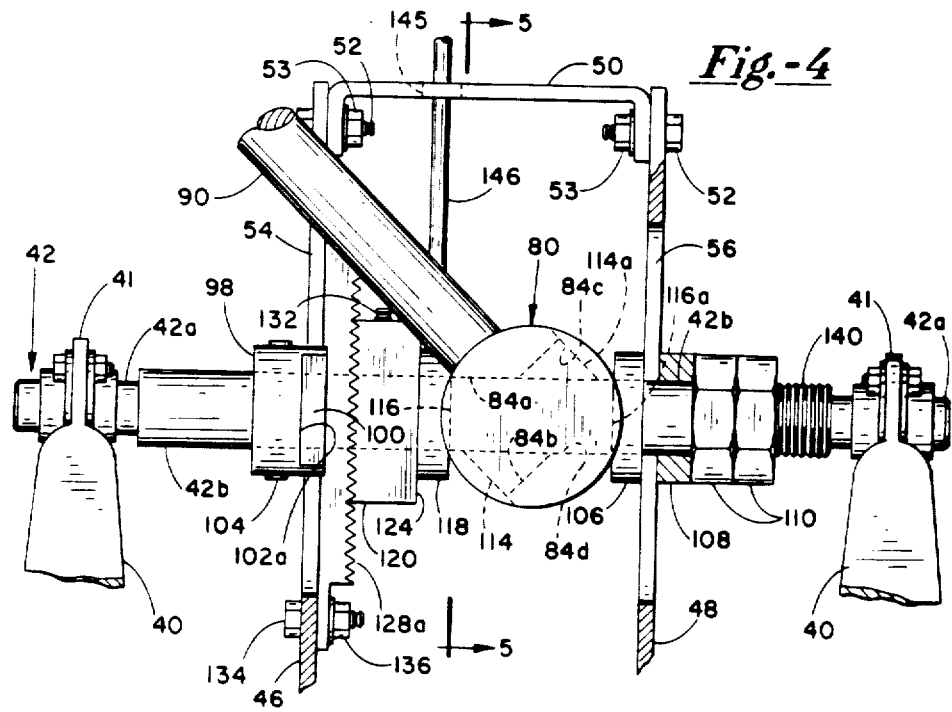
Figure 5:
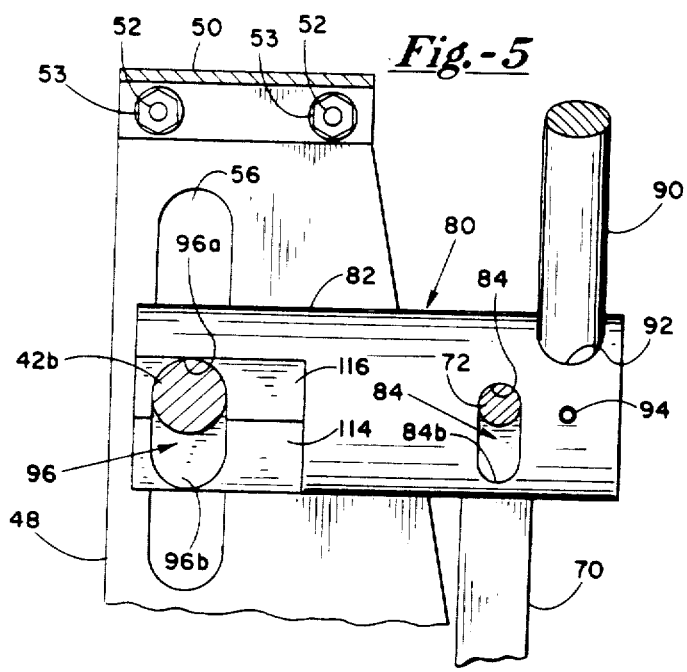

The arms 40 are suspended from bearings 41 on an upper pivot shaft 42 more specifically, the shaft 42 has reduced diameter end portions 42a and a larger intermediate portion 42b, as can be discerned from FIGS. 2, 4 and 6, the bearings 41 being mounted on the end portions 42a. Whereas the arms 40 swing or oscillate about the upper shaft 42, the arms 40 have attached at their lower ends a U-shaped knife blade 44, the knife blade 44 extending horizontally or laterally between the lower ends of the side arms 40.

Included in the frame 12 are a pair of side plates 46 and 48, portions of the side plate 46 being visible in FIGS. 1 and 6, but portions of both of these plates 46, 48 being visible in FIGS. 2 and 4. For the sake of completeness, a spacer in the form of a U-shaped channel member 50 extends between the upper portions of the side plates 46, 48, being secured thereto by bolts 52 and nuts 53.

Although perhaps better understood from said Ditter patent, nonetheless, slots 54 and 56 are provided in the side plates 46, 48, respectively. The slot 54 appears in FIG. 6, but both of these slots 54, 56 appear in FIGS. 2 and 4. As will presently become clear, laterally spaced sections of the larger intermediate portion 42b of the pivot shaft 42 are guided for vertical movement in these slots 54, 56. Since the U-shaped knife blade 44 is attached to the lower ends of the oscillatory side arms 40, it follows that when the pivot shaft 42 is raised or lowered, the knife blade 44 will likewise be raised or lowered for the purpose of determining the blade's depth of cut.

The foregoing description has dealt with a typical construction of a sod cutter, such as the sod cutter 10 illustrated in FIG. 1 and which is more completely described in said Ditter patent.

What follows will be concerned chiefly with a description of my mechanism for not only raising and lowering the oscillatory side arms 40, and hence the knife blade 44 attached thereto, plus the locking of the side arms in their adjusted position, the mechanism for doing this being indicated generally by the reference numeral 60.

Although other arrangements can be employed, attention is directed to a tubular bearing 62 that loosely encircles a bushing 64 having a pin or bolt 66 extending therethrough which also extends through the lower portions of the side plates 46, 48. The purpose of the tubular bearing 62 is to pivotally mount a pair of laterally spaced support strips 68, 70, the lower ends of these support strips 68, 70 having holes therein through which the tubular bearing 62 extends and the lower ends being secured to the tubular bearing 62 by means of welds at 71a and 71b. It is important to understand that the tubular bearing 62 supports the strips 68 and 70 for pivotal or rocking movement about an axis provided by the bushing 64 and the pin or bolt 66 extending through the bushing 64.

At the upper ends of the support strips 68, 70 is another pin or bolt 72 that pivotally or rockably supports a cam unit 80 comprised of a cylindrical barrel 82 having a bore 84 formed therein and through which the bolt or pin 72 extends. The shape of the bore 84 is important and it can be described as having a "bow tie" configuration as can be best understood from FIG. 9. It will be helpful to identify curved surfaces formed in the bore 84; therefore, it will be seen that the bore 84 includes curved surfaces 84a, 84b, 84c and 84d.

At this time, a handle 90 will be referred to; this handle 90 (at least a portion thereof) appears in FIGS. 1, 2, 3, 4, 5 and 6. From FIG. 7, it will be perceived that a drilled bottomed hole or recess 92 is radially formed in the cylindrical barrel 82 and that a hole 93 communicates therewith for the reception of a pin 94 that anchors the lower end of the handle 90 in the hole or recess 92. In this way, the barrel 82 can be rocked in a fore and aft direction about the bolt or pin 72.

The fore and aft rocking movement is permitted because the curved surfaces 84b and 84c of the bore 84 contact or engage the bolt or pin 72, permitting rotation of the cam barrel 82 in a counterclockwise direction as viewed in FIG. 7. On the other hand, the barrel 82 can be moved to the left or counterclockwise as viewed in FIG. 9 so that the surfaces 84a and 84d engage the pin or shaft 72. All that need be understood at this stage is that a four-direction rocking movement is attainable by virtue of the shape of the bore 84; the bore 84 has previously been described as possessing a "bow tie" configuration and this is clearly shown, it is believed, in FIG. 9.

Whereas one end portion (the end containing the bore 84 therein) of the cylindrical barrel 82 has just been described, the other end portion thereof will now be described. In this regard, a bore 96 is provided which also has a "bow tie" configuration as can be seen in FIG. 8. In this instance, the curved surfaces have been identified by the reference numerals 96a, 96b, 96c and 96d.

It should be understood that the pivot shaft 42, more specifically its larger intermediate portion 42b, extends through the bore 96. When the handle 90 is moved forwardly to cause the pivot shaft 42 to move downwardly (and also the side arms 40 and the knife blade 44 attached to the lower ends of the arms 40), the curved surfaces 96b and 96c remaining in contact with the larger intermediate portion 42b of the pivot shaft 42 to cause the shaft 42 to move downwardly, actually being forced downwardly by the upper curved surface 96c.

On the other hand, when the handle 90 is moved sufficiently in a transverse or counterclockwise direction as viewed in FIG. 2, then the surfaces 96a and 96d engage the larger intermediate portion 42b of the pivot shaft 42. Stated somewhat differently, the transverse movement of the handle 90 is permitted by reason of the bow tie shape of the bore 84 and by reason of the bow tie shape of the bore 96. The barrel 82 under these circumstances rocks or pivots about the bolt or pin 72 and also about the larger intermediate portion of 42b of the pivot shaft 42.

The foregoing descriptive portion involves the fore and aft manipulation of the handle 90 which lowers or raises the pivot shaft 42, and hence the knife blade 44 at the lower ends of the side arms 40, the forward movement of the handle 90 lowering the pivot shaft 42 and the rearward movement of the handle 90 raising the pivot shaft 42. The pivot shaft 42, of course, is constrained to move freely downwardly (or upwardly) by reason of the slots 54, 56 provided in the side plates 46, 48.

The way in which the pivot shaft 42 is guided or constrained for vertical movement is through the agency of an alignment collar 98, the collar 98 having a key or rib 100 thereon which freely rides in the slot 54. In other words, segments 102a and 102b (best understood from FIG. 6) flank the key or rib 100 and bear against marginal portions of the left face of the plate 46 at either side of the slot 54.

It will be understood that the pivot shaft 42 does not move laterally. Preventing the pivot shaft 42 from moving or shifting in a lateral or axial direction is the collar 98 having a spring pin 104 extending therethrough, the pin 104 also extending through the large intermediate portion 42b of the shaft 42. Segments 102a and 102b, as already mentioned, bear against the left face of the side plate 46, being of larger diameter than the width of the slot 54 in the side plate 46. Additionally, there are collars 106 and 108 at the right in FIGS. 2 and 4 which bear against the marginal portions of the side plate 48 residing adjacent the slot 56 formed therein. A pair of jam nuts 110 threaded on a threaded portion 140 of the shaft 42 position the collars 98, 106 and 108 so that axial movement of the shaft 42 is prevented.

Having referred to the raising and lowering made possible by the fore and aft manipulation of the handle 90, it will now be explained how the locking at the selected depth of the blade 44 is realized. FIG. 2 illustrates the handle 90 in a vertical relationship, which can be considered to be either in a completely forward position or a completely rearward position (or some position in between). The point to appreciate is that the angular position of the handle 90 in a fore or aft direction determines the depth of the blade 44.

It is now important that the desired depth of the blade 44 be maintained. This is done by moving the handle 90 to the left or in a counterclockwise direction from the position in which it appears in FIG. 2 to the position in which it appears in FIG. 4. Once again, the bow tie configuration of the bore 84 and also the bow tie configuration of the bore 96 permit the handle 90 to be moved from the position shown in FIG. 2 to that illustrated in FIG. 4. When the handle 90 is in the position shown in FIG. 2, the curved surfaces 84b and 84c engage the bolt or pin 72 and under these conditions the surfaces 96b and 96c engage the larger intermediate portion 42b of the pivot shaft 42.

However, when the handle 90 is moved to the left or in a clockwise direction from which it appears in FIG. 2 to the position in which it appears in FIG. 4, the surfaces 84a and 84d engage the bolt or pin 72, and by the same token the curved surfaces 96a and 96d of the bore 96 engage the larger intermediate portion 42b of the pivot shaft 42.

Reference will now be made to two angular flats or cam surfaces 114 and 116 formed on the outer surface of the cylindrical barrel 82. The flat 114 is closer to the axis of rotation of the cylindrical barrel 82 than the flat 116, the reason for which is given below. Reactive flats 114a and 116a are located diametrically opposite the flats 114 and 116, respectively.

In this regard, attention is now directed to an annular cam follower 118 that freely encircles the larger diameter portion 42b of the pivot shaft 42 which is engagable by either of the flat cam surfaces 114 or 116, depending upon whether the handle 90 is in the position shown in FIG. 2 or in the position in which it is illustrated in FIG. 4. In the nine o'clock position of the flat 114, as it appears in FIG. 2, the flat 114a, being diametrically opposite the flat 114, is in a three o'clock position, reacting against the fixed collar 106. In the nine o'clock position of the flat 116, as it appears in FIG. 4, the flat 116a, being diametrically opposite the flat 116, in in a three o'clock position, reacting against the fixed collar 106.

The cam follower 118 acts against a block member 120 having a bore 122 extending therethrough, the larger intermediate portion 42b of the pivot shaft 42 passing through the bore 122. In FIG. 2 the cam follower 118 engages the flat back, which has been given the reference numeral 124, of the block member 120 because the flat 114 in FIG. 2 is in a nine o'clock position, whereas the follower 118 is engaged by the flat 116 to cam the block member 120 to the left in FIG. 4 by reason of the flat 116 assuming the nine o'clock position rather than the flat 114, the flat 116 being at a greater radial distance from the axis of rotation of the cylindrical barrel 82 than is the flat 116. The left side of the block 120, that is, the side remote from its flat back 124, has two racks 126a and 126b formed thereon, each being composed of a series of gear teeth.

What occurs when the block member 120 is moved to the left, as is done when the handle 90 is moved in a counterclockwise direction or to the left from the position shown in FIG. 2 to that illustrated in FIG. 4, is that the block member 120 is cammed to the left from the position in which it is shown in FIG. 2 to a position farther to the left as is shown in FIG. 4. The block member 120 is constrained for only longitudinal movement along the shaft portion 42a by means of a pin 132 threaded through a tapped hole 134 extending downwardly through the upper portion of the block member 120. In that the lower end of the threaded pin 132 engages in a longitudinally formed groove (not shown) in the portion 42b of the shaft 42, the pin 132 and the groove into which it extends function as a key (the pin 132) and the keyway (the groove) to prevent unwanted rotation of the block member 120 about the shaft portion 42b.

The above action produces an engagement of the racks 126a, 126b with two additional racks labeled 128a, 128b. The racks 128a, 128b are formed on strips 130a, 130b, attached to the side plate 46 by means of bolts 134 and nuts 136, there being slots 140 at the upper and lower ends of the strips 130a and 130b, as can be seen in FIG. 6.

Cammed movement of the block member 120 to the left from the position illustrated in FIG. 2 to that shown in FIG. 4 compresses a coil spring 142 that encircles the larger intermediate portion 42b of the pivot shaft 42. In other words, the block member 120 is biased to the right by the spring 142. Such a biasing action causes the racks 126a, 126b to become disengaged from the racks 128a, 128b when allowed to do so by the cam flat 114 being in a nine o'clock position rather than the flat 116.

Whereas the right end of the coil spring 142 bears against the forward face (which will be given the reference numeral 144) of the block member 120, the left end of the coil spring 142 bears against the upper and lower end portions of the key or rib 100 of the alignment collar, the key or rib 100 being dimensioned so that it projects completely through the slot 54.

Extending upwardly from the annular cam follower 118 through a slot 145 in the channel-shaped spacer 50 is a rod 146 having a stop member 148 (FIG. 2) that encircles the upper portion of the rod 146, the stop member 148 having a bore or passage 150 extending therethrough. By means of a set screw 152, the stop member 148 can be retained at a desired position on the rod 146. When the position of the pivot shaft 42 is lowered so as to cause the knife blade 44 to be at a desired depth, the stop member 148 can be lowered so as to engage the upper surface of the U-shaped spacer 50. However, whenever the shaft 42 is raised, such as at the end of a pass over a field of turf, the handle 90 can be pulled rearwardly to raise the pivot shaft 42, and of course the knife blade 44 mounted at the lower ends of the oscillatory side arms 40. When a reverse traverse of the turf is to be inaugurated, after the sod cutter 10 has been turned around, all that the operator need do is to move the handle 90 forwardly once again, and when the stop 146 strikes the channeled spacer 50 the initially selected depth of the knife blade 44 is reestablished.

Of course, whenever the blade 44 is to be raised or lowered, the handle 90 is first moved back or clockwise from the position shown in FIG. 4 to that shown in FIG. 2. This disengages the two shiftable racks 128a, 128b from the two racks 126a, 126b, these latter racks 126a, 126b being fixedly mounted on the side plate 46, so that the racks 128a and 128b can move upwardly and downwardly in unison with the pivot shaft 42.

It should be appreciated that the single handle 90 permits the operator to not only position the knife blade 44 at the proper depth but to positively hold the knife blade 44 at the selected depth by reason of the engagement of the racks 128a, 128b with the racks 126a, 126b. Such a simplified handle movement, that is, the one handle 90 in lieu of the two handles employed in prior art earthworking machines, enable inexperienced operators to manipulate readily the sod cutting blade 44 to the proper depth and maintain that depth once the appropriate depth has been determined. In other words, my mechanism 60 makes the sod cutter 10, or whatever earthworking machine is utilizing my invention, user friendly and minimizes operator confusion, especially where the operator is inexperienced, having perhaps only rented a sod cutting machine (or other oscillatory earthworking machine) and is not familiar with its operation.

In summation, the fore and aft movement of the handle 90 in the direction the sod cutter 10 travels causes the knife blade 44 to move downwardly when the handle 90 is moved forwardly and to be raised when moved rearwardly; such forward and rearward movements are about an axis provided by the pin 72. When the handle 90 is moved laterally or to travel, the racks 126a and 126b are meshed with the racks 128a and 128b. When the handle 90 is moved to the right or in a clockwise direction when looking in the direction of travel of the sod cutter 10, the unmeshing and unlocking of the racks 128a, 128b and 130a, 130b is achieved. Such left and right movements are about an axis provided by the cylinder 82, this last-mentioned axis intersecting the axis provided by the pin 72. With the racks 128a, 128b and the racks 130a, 130b engaged, no vertical adjustment of the blade 44 can be made. Owing to the racks 130a, 130b being longer than the racks 128a, 128b, it will be recognized that the racks 128a, 128b can be engaged with the racks 130a, 130b at whatever blade depth is selected and such depth maintained until a different depth is wanted.

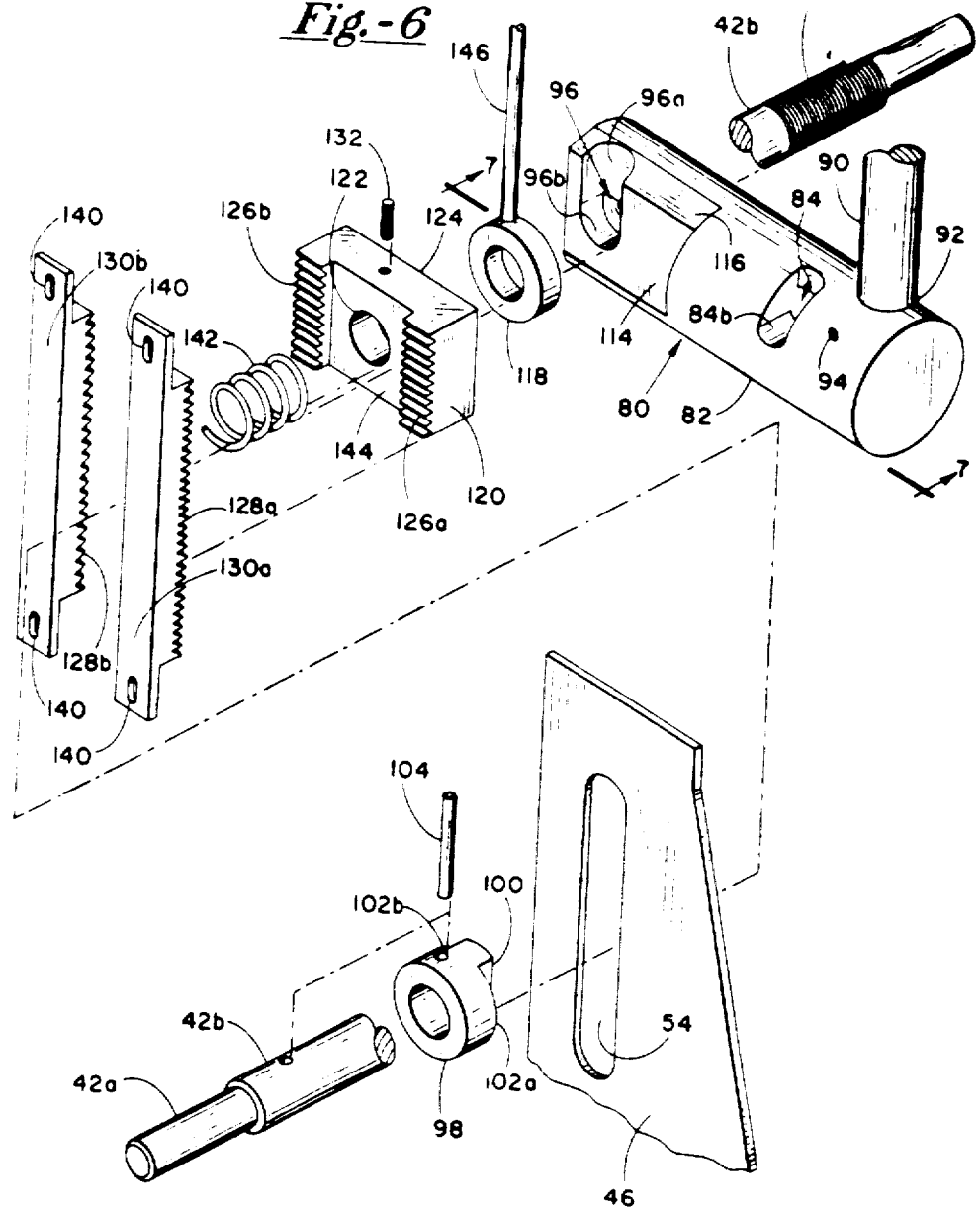

I claim:

1. An earthworking machine comprising blade means mounted for oscillatory and vertical movement, power means for oscillating said blade means, movably mounted first gear means including a plurality of teeth fixedly mounted second gear means including a plurality of teeth and means including a single handle movable in first and second generally opposite directions for vertically adjusting said blade means and said movably mounted first gear means, and in third and fourth generally opposite directions for locking and unlocking said blade means in a vertically adjusted position, said third and fourth opposite directions being generally transverse to said first and second opposite directions, and said third generally opposite direction causing engagement of said first gear means with said second gear means to lock said blade means in a vertically adjusted position and said fourth generally opposite direction causing disengagement of said first gear means from said second gear means to unlock said blade means from a vertically adjusted position.

2. An earthworking machine in accordance with claim 1 in which said first and second generally opposite directions are forwardly and rearwardly with respect to the machine's direction of travel.

3. An earthworking machine in accordance with claim 2 including means providing intersecting first and second axes, said first axis extending generally at right angles to the machine's direction of travel and said second axis extending generally in the machine's direction of travel, said means movable in said first, second, third and fourth directions being mounted for rocking movement on said first axis for achieving movement in said first and second opposite direction to vertically adjust said blade means and said firs gear means, and being mounted for rocking movement on said second axis for achieving movement in said third and fourth opposite directions, rocking movement on said second axis in said third opposite direction causing engagement of said first gear means with said second gear means and rocking movement on said second axis in said fourth opposite direction causing disengagement of said first gear means from said second gear means.

4. An earthworking machine in accordance with claim 1 including stop means for re-establishing the vertically adjusted position of said blade means via said first and second gear means after said first gear means has been disengaged from said second gear means and said blade means has been raised from its vertically adjusted position.

5. An earthworking machine comprising blade means mounted for oscillatory and vertical movement, power means for oscillating said blade means, means including a single handle movable in first and second generally opposite directions forwardly and rearwardly with respect to the machine's direction of travel for vertically adjusting said blade means and in third and fourth generally opposite directions for locking and unlocking said blade means in a vertically adjusted position, said third and fourth opposite directions being generally transverse to said first and second opposite directions, means providing intersecting first and second axes, said first axis extending generally at right angles to the machine's direction of travel and said second axis extending generally in the machine's direction of travel, said means movable in said first, second, third and fourth directions being mounted for rocking movement on said first axis for achieving movement in said first and second opposite directions and being mounted for rocking movement on said second axis for achieving movement in said third and fourth opposite directions, said means movable in said first, second, third and fourth directions including a member extending forwardly from said single handle for lowering said blade means when said single handle is rocked in said first direction and for raising said blade means when said single handle is rocked in said second direction, and said means movable in said first, second, third and fourth directions additionally including movably mounted first gear means, fixedly mounted second gear means, and cam means for causing engagement of said first gear means with said second gear means for retaining said blade means in a vertically adjusted position when said single handle is rocked in said third direction and for disengaging said first gear means from said second gear means when said single handle is rocked in said fourth direction.

6. An earthworking machine in accordance with claim 5 in which said first and second gear means constitute first and second gear racks, respectively, each having a set of linearly arranged teeth.

7. An earthworking machine in accordance with claim 6 in which said second gear rack is longer than said first gear rack.

8. An earthworking machine in accordance with claim 5 in which said cam means includes first and second angularly arranged actuating flats, a cam follower for moving said first gear means, said second flat urging said follower in a direction to effect engagement of said first gear means with said second gear means when said second flat is angularly oriented with said follower and said first flat permitting disengagement of said first gear means from said second gear means when said first flat is angularly oriented with said follower.

9. An earthworking machine in accordance with claim 6 including spring means for disengaging said first gear means from said second gear means when said first flat is angularly oriented with said follower.

10. An earthworking machine adapted to traverse a field to be worked comprising a handle mounted for rocking movement in four angular directions, oscillatory blade means, means responsive to the rocking movement of said handle in two of said four directions for raising and lowering said blade means, and means responsive to the rocking movement of said handle in the remaining two of said directions for locking and unlocking said blade means in a desired vertical position determined from the rocking movement of said handle in one of said first two of said four directions, said means responsive to the rocking movement of said handle in said two remaining directions including a fixed gear rack having a first series of teeth thereon and a movable gear rack having a second series of teeth thereon, the teeth on said movable gear rack being engagable with the teeth on said fixed gear rack to lock said blade means in a desired vertical position.

11. An earthworking machine adapted to traverse a field to be worked comprising a handle mounted for rocking movement in four angular directions, oscillatory blade means, means responsive to the rocking movement of said handle in two of said four directions for raising and lowering said blade means, and means responsive to the rocking movement of said handle in the remaining two of said directions for locking and unlocking said blade means in a desired vertical position determined from the rocking movement of said handle in one of said first two of said four directions, said means responsive to the rocking movement of said handle in said two remaining directions including a fixed gear rack and a movable gear rack, said movable gear rack being engagable with said fixed gear rack to lock said blade means in a desired vertical position, said means responsive to the rocking movement of said handle in said two remaining directions also including a cam unit for causing engagement of said movable gear rack with said fixed gear rack.

12. An earthworking machine in accordance with claim 11 including spring means for biasing said movable ear rack out of engagement with respect to said fixed ear rack when permitted to do so by said cam unit.

13. An earthworking machine in accordance with claim 12 in which said means responsive to the rocking movement of said handle in said two directions include a pivot shaft about which said blade means oscillates and a cylindrical barrel, said pivot shaft extending through a bore in one end portion of said cylindrical barrel and said handle being attached to the other end portion of said barrel, and a pin extending through a second bore in said other end portion of said barrel to permit rocking movement of said handle in said two directions.

14. An earthworking machine in accordance with claim 13 in which each of said bores possesses a bow tie configuration to permit said handle to be rocked in said two remaining directions.

* * * * *

UNITED STATES PATENT AND TRADEMARK OFFICE
CERTIFICATE OF CORRECTION

PATENT NO. : 5,009,270  Page 1 of 5
DATED : April 23, 1991
INVENTOR(S) : Kip S. Vangsgard It is certified that error appears in the above-identified patent and that said Letters Patent is hereby corrected as shown below:

The sheets of drawings including Figures 2, 3, 5, and 6 should be deleted to be replaced with the sheets of drawings as shown on the attached sheets.

Column 2, line 2, cancel "singe" and substitute therefor --single--.

Column 4, line 54, cancel "remaining" and substitute therefor --remain--.

Column 8, line 9, after "teeth" insert --,--.

Column 8, line 11, after "teeth" insert --,--.

Column 8, line 39, cancel "firs" and substitute therefor --first--.

Column 9, line 42, cancel "6" and substitute therefor --8--.

Column 10, line 34, cancel "ear" and substitute therefor --gear--.

Column 10, line 35, cancel "ear" and substitute therefor --gear--.

Signed and Sealed this

Twenty-ninth Day of September, 1992

Attest:

DOUGLAS B. COMER

Attesting Officer   Acting Commissioner of Patents and Trademarks